US010899873B2

(12) United States Patent
Flosser et al.

(10) Patent No.: US 10,899,873 B2
(45) Date of Patent: Jan. 26, 2021

(54) PROCESS FOR PREPARING EPOXY RESINS

(71) Applicant: Hexion Inc., Columbus, OH (US)

(72) Inventors: David Flosser, Missouri City, TX (US); Jerry R. Hite, Sugar Land, TX (US); Larry Steven Corley, Houston, TX (US); Bedri Erdem, Stafford, TX (US)

(73) Assignee: HEXION INC., Columbus, OH (US)

( * ) Notice: Subject to any disclaimer, the term of this patent is extended or adjusted under 35 U.S.C. 154(b) by 0 days.

(21) Appl. No.: 15/702,401

(22) Filed: Sep. 12, 2017

(65) Prior Publication Data
US 2019/0077906 A1 Mar. 14, 2019

(51) Int. Cl.
| | |
|---|---|
| *C08G 59/02* | (2006.01) |
| *C08L 63/00* | (2006.01) |
| *C08L 63/02* | (2006.01) |
| *C09D 163/00* | (2006.01) |
| *C09D 163/02* | (2006.01) |
| *C09J 163/00* | (2006.01) |
| *C09J 163/02* | (2006.01) |
| *C08G 59/24* | (2006.01) |
| *C08G 59/68* | (2006.01) |
| *C08G 59/62* | (2006.01) |
| *C08G 59/06* | (2006.01) |

(52) U.S. Cl.
CPC ......... *C08G 59/686* (2013.01); *C08G 59/022* (2013.01); *C08G 59/066* (2013.01); *C08G 59/245* (2013.01); *C08G 59/621* (2013.01)

(58) Field of Classification Search
None
See application file for complete search history.

(56) References Cited

U.S. PATENT DOCUMENTS

| | | | | |
|---|---|---|---|---|
| 4,105,634 A | * | 8/1978 | Hanson | C08G 59/066 525/523 |
| 4,572,853 A | * | 2/1986 | Ikeya | C08G 59/621 174/110 SR |
| 4,734,468 A | | 3/1988 | Marx | |
| 5,019,639 A | * | 5/1991 | Hofer | C08G 59/04 528/102 |
| 5,132,423 A | | 7/1992 | Brunelle et al. | |
| 6,677,426 B2 | | 1/2004 | Noro et al. | |
| 7,879,621 B2 | | 2/2011 | Gjerde et al. | |
| 9,242,243 B2 | | 1/2016 | Zhou et al. | |
| 2004/0224362 A1 | | 11/2004 | Gjerde et al. | |
| 2005/0261398 A1 | * | 11/2005 | Koeniger | C08G 59/4246 523/461 |
| 2012/0238648 A1 | | 9/2012 | Zhou et al. | |
| 2014/0094535 A1 | | 4/2014 | Guggenheim et al. | |
| 2014/0099510 A1 | | 4/2014 | Chiong et al. | |

FOREIGN PATENT DOCUMENTS

WO WO2011/038198 3/2011

OTHER PUBLICATIONS

Flosser, David: "A Simple Conversion of Alcohols to Alkyl Fluorides: Cause of the High Anionic Reactivity of Hexaalkylguanidinium Salts", Thesis, Ph.D., Penn State, (2001).
Flosser, David: "A Useful Conversion of Alcohols to Alkyl Fluorides", Tetrahedron Letters, vol. 43, pp. 4275-4279, Pergamon (2002), New York.
Flosser, David, et al.: "Improved Synthesis of Dialkylaminopyrrolines", Synthetic Communications vol. 33, No. 12, pp. 2045-2052 (2003), New York.
Senet, J.-P.: "The Recent Advance in Phosgene Chemistry", L'Imprimerie GPA a Nanterre, France (1997).

* cited by examiner

*Primary Examiner* — Michael J Feely

(57) ABSTRACT

An epoxy oligomerization catalyst can be employed to prepare an epoxy resin employing a method including admixing a first epoxy resin having a first epoxy equivalent weight of from about 100 to about 600 with a diphenolic compound, and a catalyst, thereby forming a second epoxy resin having a second epoxy equivalent weight of from about 200 to about 10,000; wherein the catalyst is a guanidinium catalyst. The second equivalent weight is greater than the first equivalent weight.

14 Claims, 4 Drawing Sheets

PROCESS FOR PREPARING EPOXY RESINS

BACKGROUND OF THE INVENTION

Field of the Invention

The present invention relates to epoxy resins. The present invention particularly relates to epoxy resins prepared using a guanidinium catalyst.

Background of the Art

Historically, epoxy resins have been manufactured using many different catalysts. Exemplary catalysts include: NaOH, KOH, triethanolamine, triphenylphosphine. ethyltriphenylphosphonium acid acetate (ETPPAAc), and ethylphenylphosphonium iodide (ETPPI).

These catalysts along with the others used commercially, while broadly and conventional used, are not without problems. It would be desirable in the art of preparing epoxy resins to prepare them with catalysts that are economical and not water sensitive. It would also be desirable within the art that the catalysts not introduce compounds which are environmentally undesirable.

SUMMARY OF THE INVENTION

In one aspect, the invention is a process for making an epoxy resin comprising: admixing a first epoxy resin having a first epoxy equivalent weight of from about 100 to about 600 with a diphenolic compound, and a catalyst, thereby forming a second epoxy resin having a second epoxy equivalent weight of from about 200 to about 10,000; wherein the catalyst is a guanidinium catalyst. The second equivalent weight is greater than the first equivalent weight. In some embodiments, the guanidinium catalyst has a general formula:

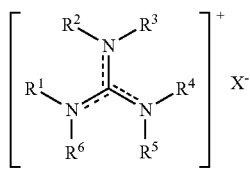

wherein each $R^{1-6}$ are the same or different and may be selected from the group consisting of hydrogen, methyl, ethyl, propyl, butyl, isopropyl, isobutyl, t-butyl, phenyl, benzyl, cyclohexyl, alkylated benzyl, and halogenated benzyl and X is selected from the group consisting of chloride, bromide, iodide, fluoride, t-butoxide, n-butoxide, isobutoxide, tosylate, acetate, methoxide, ethoxide, hydroxide, and combinations thereof.

In another aspect, the invention is an epoxy resin prepared in a process for making an epoxy resin comprising: admixing a first epoxy resin having a first epoxy equivalent weight of from about 100 to about 600 with a diphenolic compound, and a catalyst, thereby forming a second epoxy resin having a second epoxy equivalent weight of from about 200 to about 10,000; wherein the catalyst is a guanidinium catalyst. The second equivalent weight is greater than the first equivalent weight. In some embodiments the guanidinium catalyst has a general formula:

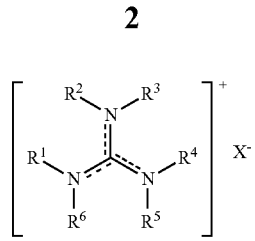

wherein each $R^{1-6}$ are the same or different and may be selected from the group consisting of hydrogen, methyl, ethyl, propyl, butyl, isopropyl, isobutyl, t-butyl, phenyl, and benzyl, and X is selected from the group consisting of chloride, bromide, iodide, fluoride, t-butoxide, n-butoxide, isobutoxide, tosylate, acetate, methoxide, ethoxide, hydroxide, and combinations thereof.

In still another aspect, the invention is an article of manufacture prepared using an epoxy resin prepared in a process for making an epoxy resin comprising: admixing a first epoxy resin having a first epoxy equivalent weight of from about 100 to about 600 with a diphenolic compound, a catalyst, and an optional solvent thereby forming a second epoxy resin having a second epoxy equivalent weight of from about 200 to about 10,000; wherein the catalyst is a guanidinium catalyst. The second equivalent weight is greater than the first equivalent weight. In some embodiments, the guanidinium catalyst has a general formula:

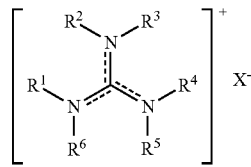

wherein each $R^{1-6}$ are the same or different and may be selected from the group consisting of hydrogen, methyl, ethyl, propyl, butyl, isopropyl, isobutyl, t-butyl, phenyl, and benzyl, and X is selected from the group consisting of chloride, bromide, iodide, fluoride, t-butoxide, n-butoxide, isobutoxide, tosylate, acetate, methoxide, ethoxide, hydroxide, and combinations thereof.

BRIEF DESCRIPTION OF THE DRAWINGS

For a detailed understanding of the present disclosure, reference should be made to the following detailed description of the preferred embodiment, taken in conjunction with the accompanying drawings listed below.

DETAILED DESCRIPTION

Figure 1:
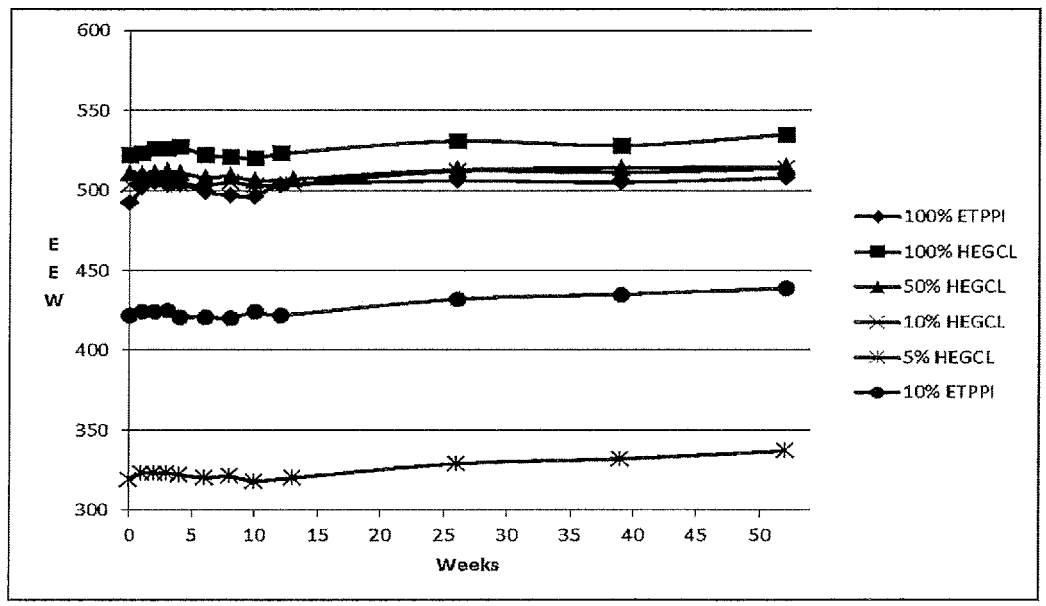
FIG. 1 is a graph showing the room temperature stability of the product of the runs made during example 1.

One embodiment of the invention is a process for making an epoxy resin comprising: admixing a first epoxy resin having a first epoxy equivalent weight of from about 100 to about 600 with a diphenolic compound, and a catalyst, thereby forming a second epoxy resin having a second epoxy equivalent weight of from about 200 to about 3500; wherein the catalyst is a guanidinium catalyst. The second equivalent weight is greater than the first equivalent weight. In some embodiments the guanidinium catalyst has a general formula:

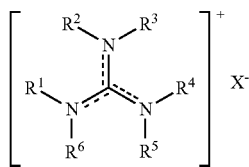

wherein each $R^{1-6}$ are the same or different and may be selected from the group consisting of hydrogen, methyl, ethyl, propyl, butyl, isopropyl, isobutyl, t-butyl, phenyl, and benzyl. The catalyst may function as an oligomerization catalyst effective at joining or fusing the first epoxy resin with diphenolic compounds to achieve a desired epoxy equivalent weight. The catalyst itself does not function to cure or cross-link the epoxy resin.

The guanidinium catalysts of the application are desirably employed at a concentration of from about 0.004 to about 0.070 weight percent based upon the weight of the first epoxy resin and diphenolic compound. In some embodiments, the catalyst may be present at a concentration of from about 0.010 to about 0.060 weight percent. In other embodiments, the catalyst may be present at a concentration of from about 0.025 to about 0.050 weight percent.

While in most instances, the diphenolic compounds have only two hydroxy functionalities, for the purposes of this application, the diphenolic compounds are polyphenolic compounds having two or more hydroxy functionalities.

The epoxy resins of the invention include a liquid epoxy resin component. Epoxy resins are those compounds containing at least one vicinal epoxy group. The epoxy resin may be saturated or unsaturated, non-aromatic, aromatic or heterocyclic and may be substituted. A liquid epoxy resin is defined as an epoxy resin with a viscosity below 100 Pa-s at 25° C. The liquid epoxy resin may also be monomeric or polymeric. The liquid epoxy resin component comprises from about 45 percent by weight (wt. %) to about 98.5 wt. %, such as about 60 wt. % to about 98.5 wt. % of the epoxy resin system.

In one embodiment, the first epoxy resin component may be prepared by reacting an epihalohydrin, such as epichlorohydrin, with a compound containing at least one, two or more, hydroxyl groups under basic conditions, such as in an alkaline reaction medium or in the presence of a suitable base.

Examples of such suitable liquid epoxy resins include, but are not limited to, polyglycidyl ethers of poly- or dihydric phenols, polyglycidyl ethers of glycols or polyglycols, epoxy novolacs, other glycidated polyphenol resins, polyglycidyl esters of polycarboxylic acids, fusion reaction products between the epoxy resins and additional polyhydric phenolic compounds such as those disclosed and described in U.S. Pat. Nos. 3,477,990 and 4,734,468 which are incorporated in their entirety herein by reference.

Examples of suitable diphenolic compounds used in preparing the liquid epoxy resins include, but are not limited to resorcinol, catechol, t-butylcatechol, hydroquinone, bisphenol A (BPA), bisphenol E (BPE), bisphenol F (BPF), tris(4-hydroxyphenyl)methane, 1,1-bis(4-hydroxyphenyl)isobutane, 2,2-bis(4-hydroxyphenyl)butane, 2,2-bis(4-hydroxy-3-tert-butylphenyl)propane, 1,1-bis(4-hydroxyphenyl) cyclohexane, 2,6,2',6'-tetrachloro-p, p'-bisphenol A, 2,6,2', 6'-tetrabromo-p,p'-bisphenol A, 2,6,2',6'-tetramethyl-3,5,3'-tribromo-p-p'-biphenol, 2,6,2',-tetramethyl-3,5,3',5'-tetrabromo-p,p'-biphenol, tetramethylbiphenol, 1,5-dihydroxynaphthalene, bis(2-hydroxy-1-naphthyl)methane, bis(4-hydroxyphenyl) sulfone, bis(4-hydroxyphenyl) ether and the like and combinations thereof. Preferred epoxy resins are aromatic or non-aromatic epoxy resins based on bisphenol A, bisphenol F, phenolic novolacs, hydrogenated bisphenol A, non-aromatic diols, or combinations thereof.

Commercial examples of suitable liquid epoxy resins include, but are not limited to, EPON™ Resins 825, 826, 828, 860, and 862 commercially available from Hexion Inc., of Columbus, Ohio.

In another embodiment, the liquid epoxy resin component may contain a monofunctional or multifunctional epoxy diluent as a viscosity reducer. Suitable diluents include monoglycidyl ethers of alcohols or polyglycidyl ethers of non-aromatic glycols or triols or polyols, or polyglycols. The additive may be a monofunctional epoxy additive, which may also include monoglycidyl esters.

In another embodiment, the liquid epoxy resin component optionally includes an acrylate material, such as an acrylate monomer containing one or more reactive acrylate double bonds. Except when otherwise described herein in specificity, an acrylate monomer refers to an acrylate or a methacrylate. In one implementation of the invention, an acrylate monomer may be a combination of monomers of an acrylate or a methacrylate. Suitable acrylate monomers include an acrylate ester of a mono-ol or polyol, a methacrylate ester of a mono-ol or polyol, or a combination thereof. Alternatively, the acrylate material may be a polyacrylate or polymethacrylate ester of a polyol which contains more than one terminal acrylate or methacrylate group. Preferred esters are the acrylic and methacrylic acid esters of non-aromatic polyhydric alcohols such as, for example, the di- and polyacrylates and the di- and polymethacrylates of alkylene glycols, alkoxylene glycols, alicyclic glycols and higher polyols, such as ethylene glycol, triethylene glycol, tetraethylene glycol, tetramethylene glycol, hexanediol, trimethylolethane, trimethylolpropane, pentaerythritol, dipentaerythritol, tripentaerythritol and the like, or mixtures of these esters with each other or with their partially esterified analogs. Other preferred esters include monoacrylate or monomethacrylate esters of an alcohol or polyol.

Examples of suitable acrylate materials are acrylate or methacrylate esters of polyols including, and are not limited to, trimethylolpropane triacrylate, trimethylolethane triacrylate, trimethylolpropane trimethacrylate, trimethylolethane trimethacrylate, neopentyl glycol diacrylate, tetramethylene glycol dimethacrylate, ethylene glycol dimethacrylate, triethylene glycol dimethacrylate, pentaerythritol triacrylate, pentaerythritol tetraacrylate, 1,6-hexanediol diacrylate, 1,6-hexanediol dimethacrylate, dipentaerythritol tetraacrylate, dipentaerythritol pentaacrylate, and combinations thereof. Particularly preferred acrylate or methacrylate esters of polyols are trimethylolpropane triacrylate, pentaerythritol tetraacrylate, neopentyl glycol diacrylate, and combinations thereof. Additional acrylate or methacrylate esters of polyols are the acrylate or methacrylate esters of epoxide resins, wherein epoxide resins as used herein are considered to be polyols.

When present in the liquid epoxy resin component, the optional acrylate material, such as an acrylate ester of a mono-ol or polyol, a methacrylate ester of a mono-ol or polyol, or a combination thereof, may be blended with the epoxy resin component from about 1 percent by weight (wt. %) to about 50 wt. %, such as from about 5 wt. % to about 40 wt. %, for example from about 10 wt. % to about 40 wt. % or from about 20 wt. % to about 40 wt. %, of the liquid epoxy resin component.

The epoxy resin system may include a non-aromatic polyol compound. The non-aromatic polyol compound may comprise a glycol having a number average molecular weight between about 1000 and 10000 (daltons).

Examples of suitable glycols include poly(ethylene oxide) glycol, polypropylene oxide) glycol, poly(butylene oxide) glycol, polytetrahydrofuran glycols, poly(ethylene adipate) glycol, polypropylene sebacate) glycol, poly(hexamethylene carbonate) glycol, silicone-alkylene oxide copolymer, poly (butadiene-co-acrylonitrile) glycol, and combinations thereof. One example of a silicone-alkylene oxide copolymer is SILWET™ L-7230 copolymer.

The epoxy equivalent weight determinations used with the process of the application may be performed in any way known to be useful to those of ordinary skill in the art. For example, ASTM D1652 may be used. In this method, the epoxy equivalent weight is determined and by titration with a solution of perchloric acid in glacial acetic acid.

The diphenolic compounds useful with the present application include but are not limited to diphenolic types such as bisphenol A-type, bisphenol F-type, bisphenol S-type, and bisphenol AD type. Multifunctional diphenolic compounds may also be used such as urethane and isocyanate-modified epoxy or bis-phenol A and their halogen or alkyl-substituted analogs. Hydrogenated versions of any of these compounds may also be used. Any diphenolic compound known to those of ordinary skill in the art which can be employed to oligomerize a first epoxy resin to a higher epoxy equivalent weight may be used with the process of the application.

Since the catalysts useful with the process of the present application are not water sensitive, there are a wide variety of solvents that may be used with the processes of the application. These include aqueous solvents including water by itself. Organic solvents which can be used with the present application include those known to be useful in epoxy resin synthesis reactions. Especially desirable are the water-soluble organic solvents such as methyl ethyl ketone, methyl isobutyl ketone, and the like.

Nonpolar solvents may also be used. For example toluene, xylenes, and other nonpolar solvents may be used with the process of the application.

While The starting or first resins useful with the process of the application have an epoxy equivalent weight of from about 100 to about 600. They are then desirably oligomerized to epoxy equivalent weights of from about 200 to about 10,000. In other embodiments the final epoxy equivalent weights of the epoxy resins are from about 600 to about 3500. And in still other embodiments, the final epoxy equivalent weights are from about 1100 to about 1800.

The catalyst useful with the process of the application has a general formula:

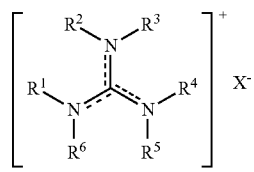

wherein each $R^{1-6}$ are the same or different and may be selected from the group consisting of hydrogen, methyl, ethyl, propyl, butyl, isopropyl, isobutyl, t-butyl, phenyl, and benzyl. In some embodiment, each of the $R^{1-6}$ are the same and are ethyl groups. In other embodiments they are the same and are propyl groups. In still other embodiments, each of the $R^{1-6}$ are independently selected from methyl, ethyl and propyl groups.

In the general formula, X can be a halide. In some embodiments, it is desirable that the halide be chloride, but other halides may be used. In most embodiments of the process of the application, the halide will be selected from the group consisting of chloride, bromide, and iodide. Less frequently, the halide will be fluoride.

Alternatively, X may also be a member selected from the group consisting of t-butoxide, n-butoxide, isobutoxide, tosylate, acetate, methoxide, ethoxide, hydroxide, and combinations thereof.

The catalysts claimed within this application are believed to have a number of desirable properties. As compared to the conventional catalysts, they are believed to have higher activity. For example, hexaethylguanidinium chloride (where all of the $R^{1-6}$ in the general formula are ethyl groups) was used to produce epoxy resins having less residual bisphenol A as compared to otherwise equivalent experiments using ethyltriphenylphosphonium iodide.

While not wishing to be bound by any theory, it is nevertheless believed that both the higher activity and the observed heat stability of the catalysts claimed in the application are due to the presence of resonance structures. For example hexaethylguanidinium chloride has 4 equivalent resonance structures (chloride ion not shown).

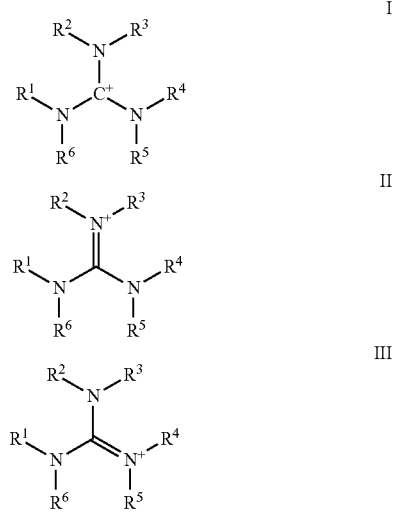

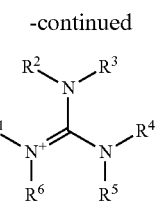

(IV)

By being able to so easily delocalized the positive charge it is believed that this resonance results in a chloride ion which is less tightly bound or more "free" as compared to the anions of some of the other catalysts. This resonance also contributes to heat stability because the delocalization of the positive charge makes the catalysts less susceptible to Hoffman eliminations.

Hexaethylguanidinium chloride, for example, has been observed to be quite water stable and has no known neurotoxicity or other extreme health hazards. It is believed that other hexaethylguanidinium halide salts will have similar properties.

Oligomerization or fusion reactions of the processes of the application may be performed using any conditions known to be useful to those of ordinary skill in the art for preparing epoxy resins.

The epoxy resins prepared according to the methods of the application may be used as infusing resins and composites. They may also be used in paint, coatings, and for manufacturing adhesives. Generally speaking, the resins prepared according to the method of the application can be used wherever a conventional resin having the same or similar physical properties could be used.

EXAMPLES

The following examples are provided to illustrate aspects of the invention. The examples are not intended to limit the scope of the invention and they should not be so interpreted. Amounts are in weight parts or weight percentages unless otherwise indicated.

TERMS AND ABBREVIATIONS

Epoxy Equivalent Weight (EEW).
Hexaethylguanidinium Chloride (HEGCl), a catalyst.
Ethylphenylphosphonium Iodide (a quaternary phosphonium iodide (ETPPI), a control catalyst.
Bisphenol A (BPA), a phenolic compound.
Propylene Glycol Methyl Ether (PGME), a solvent.
Weight Per Epoxy (WPE) is another term for Epoxy Equivalent Weight.
Dodecylbenzenesulfonic Acid (DDBSA), a surfactant.
Triphenyl Phosphine (TPP), a control catalyst.

Example 1

Procedure for Use of HEGCl in preparing Experimental Epoxy Resin 1

Experimental

Liquid Epoxy Resin A is a bisphenol A diglycidyl ether grade with an epoxy equivalent weight of 185-192 and a 25° C. viscosity of 11-15 Pa-s, sold by Hexion Inc.

Liquid Epoxy Resin A (0.5733 lb) was loaded to a deaerated reaction kettle. BPA (0.1767 lb) was charged and the reaction kettle heated to 150-250° F.

HEGCl (0.00042) was charged at that temperature and the reaction was allowed to exotherm to 385° F.

Xylene was charged (0.25 lb), and the product cooled with stirring to 100-130° F. over 30-60 minutes. A resin was then recovered for testing.

The resin had an initial epoxy equivalent weight of about 190. The product resin was tested for epoxy equivalent weight, percent nonvolatiles, gardener viscosity, gardener color, and amount of free bisphenol A. The results are shown below in Table 1. Variations, as shown in the table were made and are also recorded below.

TABLE 1

Use of HEGCl in Preparation of Experimental Epoxy Resin 1

|  | EX 1 Comp A | EX 1 Comp B | Ex. 1 A | EX. 1 B | Ex. 1 C | Ex. 1 D |
|---|---|---|---|---|---|---|
| Catalyst %*=> (a) | ETPPI-100% | ETPPI-10% | HEGCl 100% | HEGCl 50% | HEGCl 10% | HEGCl 5% |
| Charge Wt: (g) | 1.1 | 0.1171 | 1.1 | 0.55 | 0.1141 | 0.0583 |
| Catalyst fraction** | 0.00042 | 0.0000445 | 0.00042 | 0.00021 | 0.000044 | 0.000022 |
| FINALS: | Actual | Actual | Actual | Actual | Actual | Actual |
| % non-volatiles (NV) | 70.1 | 70.2 | 68.8 | 69.2 | 70 | 69.6 |
| EEW | 492.1 | 421.6 | 521.6 | 511 | 503.4 | 318.7 |
| Free BPA (PPM) | <40 | 5,135 | <40 | <40 | <40 | 26,793 |

Figure 2:
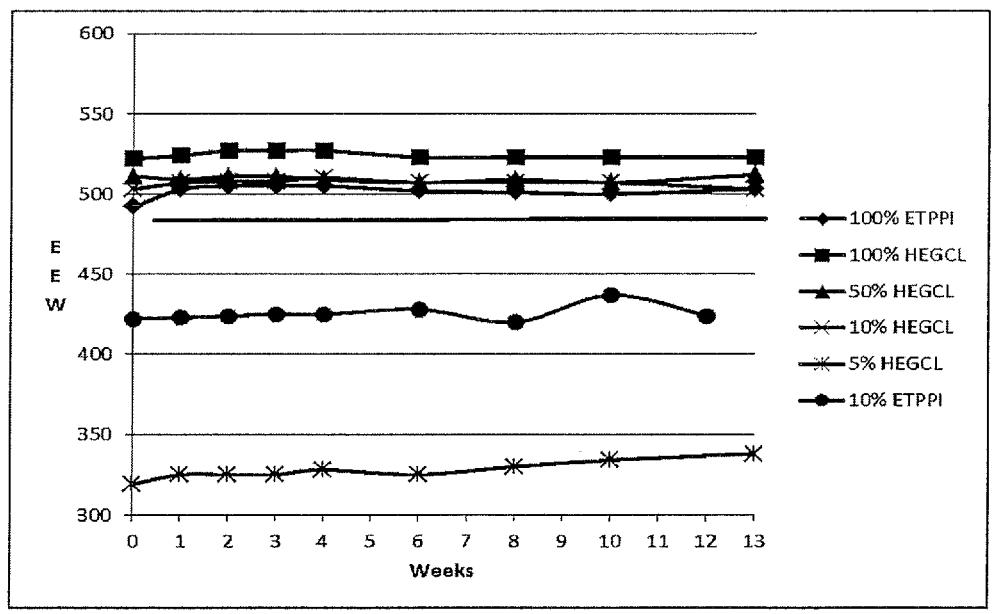
FIG. 2 is a graph showing elevated temperature stability of the product of the runs made during example 1.

*Percentage number is amount of catalyst added as percentage of amount of ETPPI that is known to be effective
**based on BPA + resin total weight Discussion The results from Table 1 should be read in conjunction with FIGS. 1 and 2. FIGS. 1 and 2 illustrate that epoxy resins made using the claimed new catalyst have equivalent stability to those made using a conventional catalyst.

The two control or comparative experiments were made using ETPPI as the catalyst. These results clearly show that HEGCl is substantially more effective or active in regards to building epoxy equivalent weight and reducing residual free bisphenol A in the resin. As illustrated, HEGCl at the same level as ETPPI builds higher epoxy equivalent weight (521 versus 492). However the HEGCl, when used at a level half as much, and even at only 10% as much as the ETTPI, builds nearly the same amount of epoxy equivalent weight (511 and 503). It should further be noted that the activated iodide is about 29% of the catalyst weight for ETTPI while the corresponding activated chloride in HEGCl is only about 12% of the catalyst weight, thus demonstrating an even more profound effect of HEGCl than is immediately obvious. HEGCl is shown to be over 10 times more active than ETTPI in this epoxy fusion reaction.

Turning to the free BPA results, ETTPI at 100% produced a resin having a free BPA level of less than 40 ppm. In contrast, in the comparative 50-100% range, the HEGCl produced no measurable free BPA using a test having a sensitivity of 40 ppm. Given the test sensitivity, the effect on BPA levels was confirmed in later experiments using controls that yielded >40 ppm BPA.

This experiment shows that the claimed catalyst, HEGCl, is from about 5 to about 10 times more active than the conventional catalyst ETPPI. Even at a concentration of just 5%, as compared to the conventional catalyst, it was able to create a substantial EEW build during the formation reaction.

Example 2

Procedure for Use of HEGCl in Preparing Experimental Resin 2

Experimental

Example 2 was prepared substantially identically to Example 1 except 0.2597 lbs of Liquid Epoxy Resin A were used; 0.1401 lbs BPA were used; 0.0001-0.0002 lbs of HEGCl were used; 0.1800 lbs of xylene was used; and 0.4200 lbs of 2-butoxyethanol were used.

The resin had an initial epoxy equivalent weight of about 190. Mid process measurements were made regarding epoxy equivalent weight and amount of free bisphenol A. The product resin was tested for epoxy equivalent weight, percent nonvolatiles, gardener viscosity, gardener color, and amount of free bisphenol A. The results are shown below in Table 2.

The comparative experiment was made using ETPPI as the catalyst. These results clearly show that HEGCl is substantially more effective or active than ETPPI in regards to building epoxy equivalent weight and reducing residual free bisphenol A in the resin. This can be seen when comparing the EEW of samples Ex 2 COMP and Ex 2 B where the same weight fractions of catalysts are used but there is much greater EEW build (2190 as compared to 2684). It should further be noted that the activated iodide is about 29% of the catalyst weight for ETTPI while the corresponding activated chloride in HEGCl is only about 12% of the catalyst weight, thus demonstrating an even more profound effect of HEGCl than is immediately obvious. These experiments demonstrated that HEGCl is more than twice as active as ETTPI.

Turning to the free BPA results, ETTPI at 100% produced a resin having a free BPA level of 340 ppm. In contrast, at 75% of the ETTPI loading by weight, the HEGCl produced less than 40 ppm free BPA using a test with a sensitivity of 40 ppm.

Example 3

Procedure for Use of HEGCl in Preparing Experimental Expoxy Resin 3

Experimental

Example 3 was prepared substantially identically to Example 1 except 0.3770 lbs of Liquid Epoxy Resin A were used; 0.1165 lbs BPA were used; 0.0001-0.0002 lbs of HEGCl were used; and 0.0406 lbs of 2-butoxyethanol were used. Also, the 2-butoxyethanol solvent was added at the high temperature to assist in cooling the reaction to 235 F after the exotherm. At that point, inversion water was added and the reaction mix stirred at 150-220F for 1 hour. The reaction was then cooled to 90-140F with mixing at full vacuum. Finally, acetone (0.0053 lb), DDBSA (0.0003 lb),

TABLE 2

Use of HEGCl in Preparation of Experimental Epoxy Resin 2

|  | EX 2 COMP | EX 2 A | Ex 2 B | Ex 2 C | Ex 2 D |
|---|---|---|---|---|---|
| Catalyst =>* | ETPPI-100% | HEGCl-50% | HEGCl-100% | HEGCl-75% | HEGCl 125% |
| Catalyst fraction** | 0.0002 | 0.0001 | 0.0002 | 0.00015 | 0.00025 |
| EEW | 2190 | 2150 | 2684 | 2649 | 2840 |
| Free BPA (PPM) of intermediate | 793 | 1208 | 57 | 53 | 7 |
| FINALS: | Actual | Actual | Actual | Actual | Actual |
| % NV | 40.42 | 40.12 | 40.07 | 39.99 | 40.03 |
| EEW | 2391.5 | 2329.8 | 2851 | 2791 | 2925 |
| Free BPA (PPM) | 340 | 444 | <40 | <40 | <40 |

Figure 3:
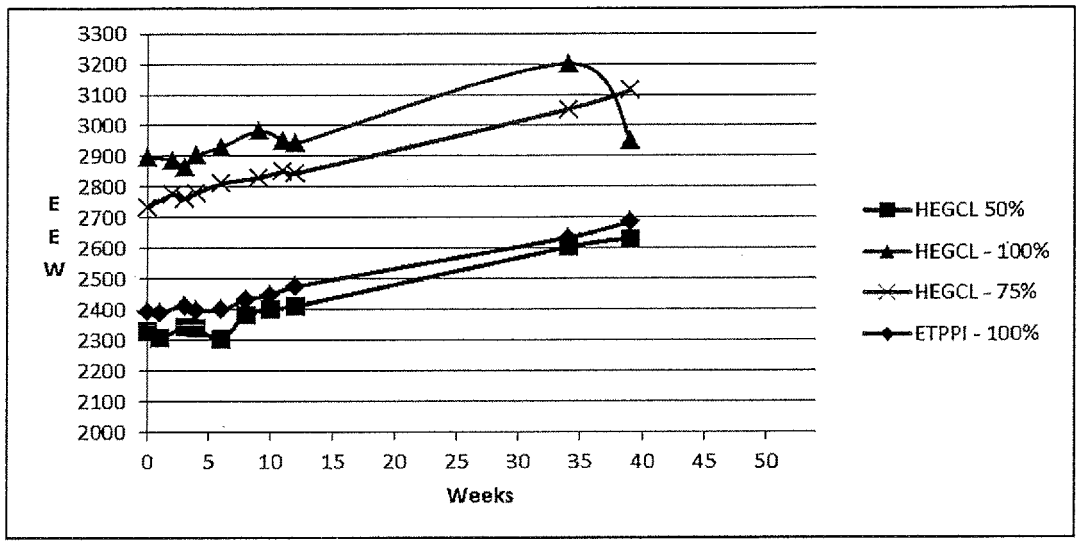
FIG. 3 is a graph showing the room temperature stability of the product of the runs made during example 2.
Figure 4:
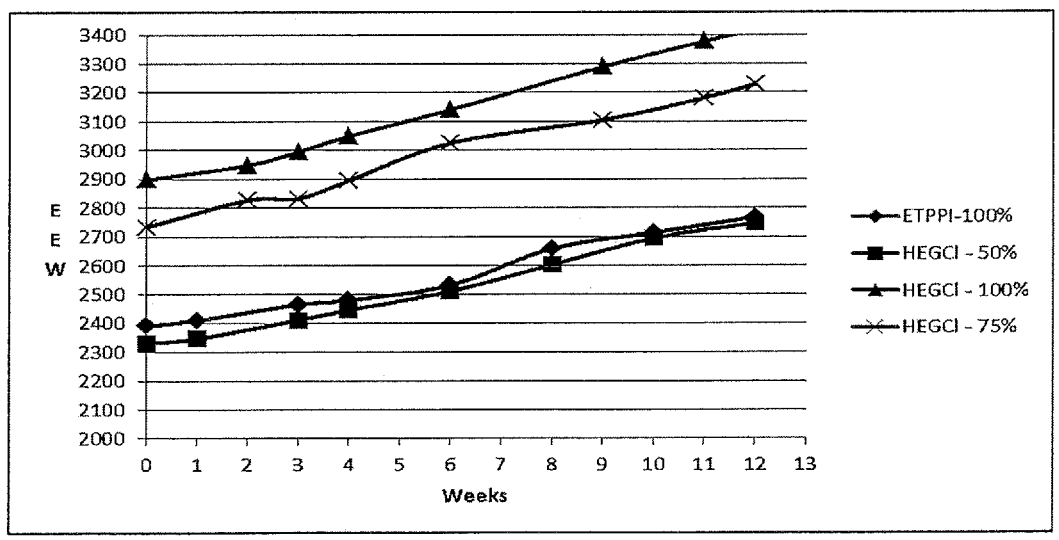
FIG. 4 is a graph showing elevated temperature stability of the product of the runs made during example 2.

*Percentage number is amount of catalyst added as percentage of amount of ETPPI that is known to be effective
based on BPA + resin total weight Discussion The results from Table 2 should be read in conjunction with FIGS. 3 and 4. FIGS. 3 and 4 illustrate that epoxy resins made using the claimed new catalysts have equivalent stability to those made using conventional catalysts. In view of all of the other data points, the drop off in the Ex 2B room temperature study in FIG. 3** is clearly an outlier and can be disregarded.

and Liquid Epoxy Resin B which is an aliphatic monoglycidyl ether containing alkyl chain between C12 and C14 in length (0.0406 lbs) were added and, after mixing, diluted to final desired solids with water.

The resin had an initial epoxy equivalent weight of about 521. In process measurements were made in regard to EEW and inversion temperature during the formation of the second resin. The final resin was tested for the properties shown. The results including variations are shown below in Table 3.

TABLE 3

Use of HEGCl in Preparation Experimental Epoxy Resin 3

|  | Ex. 3 | EX. 3 COMP |
|---|---|---|
| Catalyst | HEGCl | TPP |
| Target Charge % catalyst* | 10% | 10% |
| In Process: | | |
| EEW (in process) | 506 | 421.6* |
| Final Properties | | |
| % NV | 53.2 | 54.5 |
| EEW (final resin) | 521.3 | 449.3* |
| Visc, cps @ % NV | 2,100 (i) | 1,780 (i) |
| Free BPA (ppm) | <40 | 1,916 |

*Percentage number is amount of catalyst added as percentage of amount of TPP normally added.

Discussion

Figure 5:
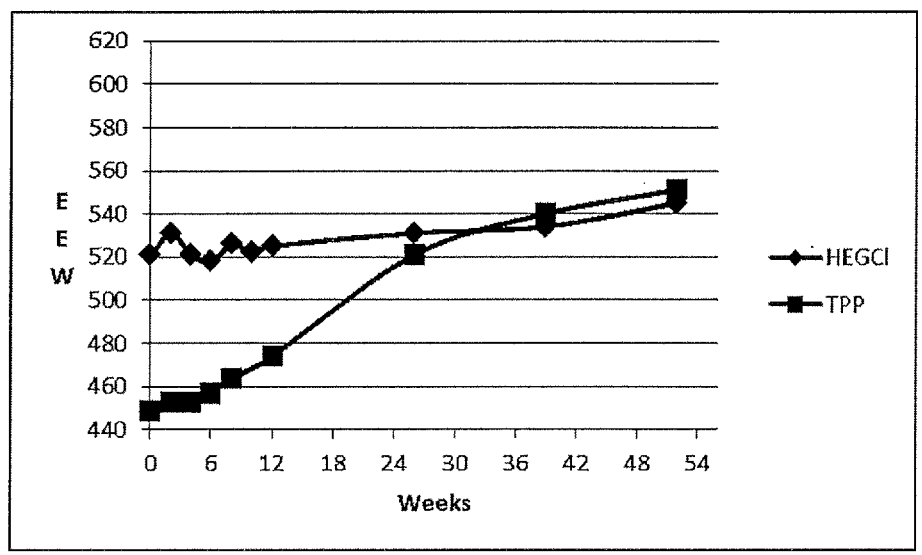
FIG. 5 is a graph of the room temperature stability of the product of runs made during example 3 where the stability is determined as a function of epoxy equivalent weight over time.
Figure 6:
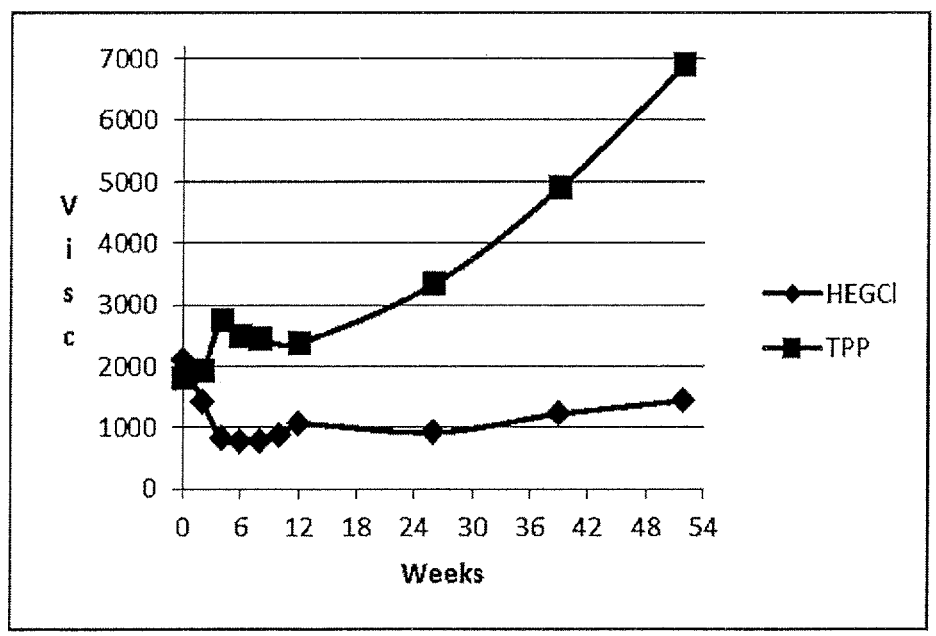
FIG. 6 is a graph of the room temperature stability of the product of the runs made during example 3 where the stability is determined as a function of viscosity over time.

The results from Table 3 should be read in conjunction with FIGS. 5 and 6. FIGS. 5 and 6 illustrate that epoxy resins made using the claimed new catalysts have far superior stability as compared to those made using conventional TPP catalysts. This Example was only tested at room temperature but was tested for both EEW and viscosity stability. The viscosity growth or instability of the resin prepared using the conventional catalyst was quite dramatic as compared to the claimed catalyst.

The comparative experiment was made using triphenyl phosphine as the catalyst. Note that only 10% of a normal charge was made and yet the claimed catalyst outperformed TPP for both EEW build and in a complete consumption of BPA as opposed to the residual BPA of nearly 2000 ppm seen in the comparative example. It should further be noted that the activated iodide is about 29% of the catalyst weight for ETTPI while the corresponding activated chloride in HEGCl is only about 12% of the catalyst weight, thus demonstrating an even more profound effect of HEGCl than is immediately obvious. These results clearly show that HEGCl is substantially more effective or active in regards to building epoxy equivalent weight and reducing residual free BPA in the resin as compared to TPP due to the much higher epoxy build at equivalent catalyst loadings.

TTP at 10% produced a resin having a free BPA of 1916 ppm. In contrast, the HEGCl at the same loading weight produced less than 40 ppm free BPA using a test has a sensitivity of 40 ppm.

Example 4

Procedure for Use of HEGCl in Preparing Experimental Epoxy Resin 4

Experimental

Example 4 was prepared substantially identically to Example 1 except that 0.3306 lb of Liquid Epoxy A was used, 0.1694 lb BPA was used, 0.000075-0.0003 lbs of HEGCl was used, 0.375 lb of xylenes was used, and 0.125 lbs of 1-butanol was used.

The resin had an initial epoxy equivalent weight of about 190. In process measurements were made in regard to EEW and free BPA. The final resin was tested for the properties shown. The results are shown below in Table 4.

TABLE 4

Use of HEGCl in Preparation of Experimental Epoxy Resin 4

|  | EX. 4 COMP | Ex 4A | Ex 4B | Ex 4C | Ex 4D |
|---|---|---|---|---|---|
| Catalyst =>[a] | ETPPI-100% | HEGCl-18% | HEGCl-36% | HEGCl-54% | HEGCl-71% |
| Catalyst Fraction | 0.00042 | 0.000075 | 0.00015 | 0.000225 | 0.0003 |
| Catalyst Form | Solid | Solid | Solid | Solid | Solid |
| In Process: | | | | | |
| EEW | 1876 | 1858 | 1965 | 1993 | 1995 |
| Free BPA (PPM) | 152 | 153 | 19 | 7 | None Detected |
| FINALS: | Actual | Actual | Actual | Actual | Actual |
| % NV | 49.92 | 49.78 | 49.47 | 50.13 | 49.96 |
| EEW | 1891.2 | 1899 | 1975 | 1984.8 | 1989.9 |
| Free BPA (PPM) | 59 | 54 | <40 | <40 | <40 |

[a]Percentage number is amount of catalyst added as percentage of amount of ETPPI normally added.

Figure 7:
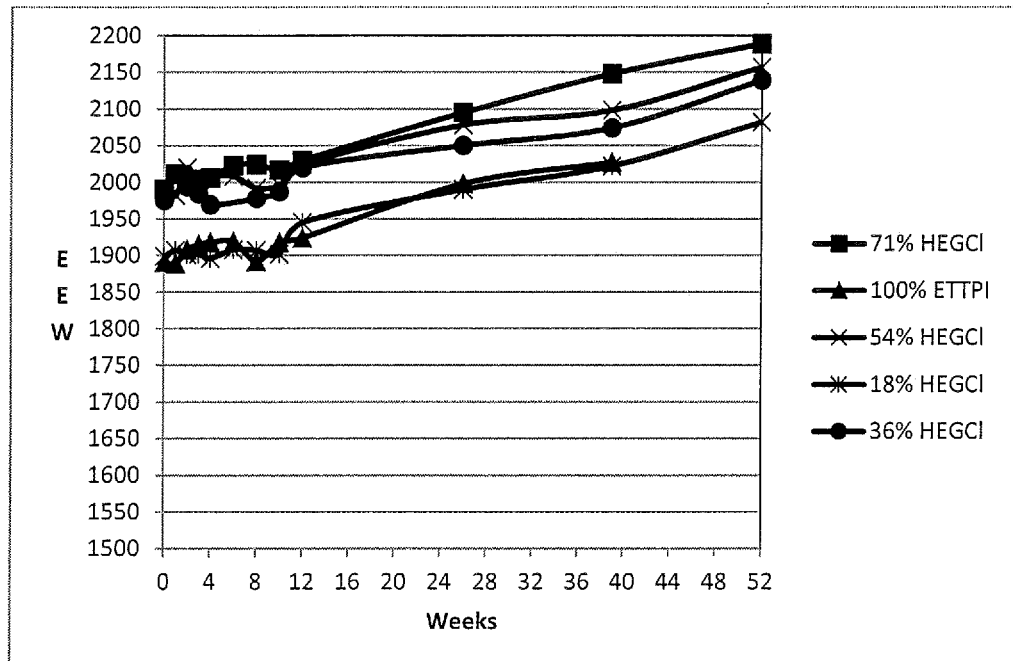
FIG. 7 is a graph showing the room temperature stability of the product of the runs made during example 4.
Figure 8:
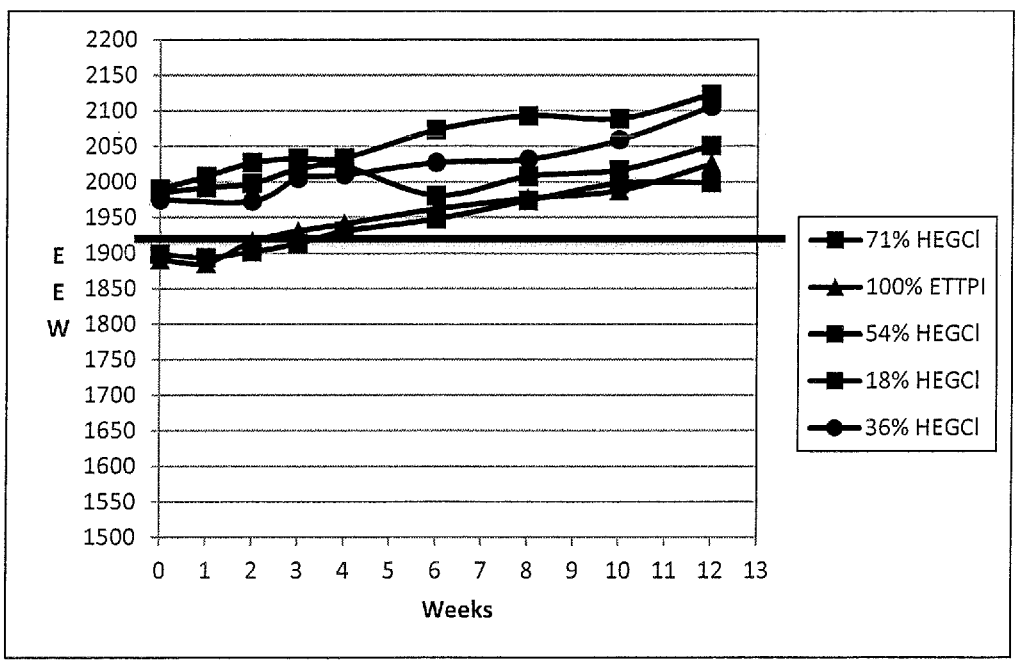
FIG. 8 is a graph showing elevated temperature stability of the product of the runs made during example 4.

The results from Table 4 should be read in conjunction with FIGS. 7 and 8. FIGS. 7 and 8 illustrate that epoxy resins made using the claimed new catalysts have substantially equivalent stability as compared to those made using conventional catalysts.

The comparative experiment was made using ETPPI as the catalyst. These results clearly show that HEGCl is substantially more effective or active in regards to building epoxy equivalent weight and reducing residual free bisphenol A in the resin. In this experiment, the new catalysts were at last 5 times more active as is demonstrated by comparing the comparative example with example 4A. Just 18% of the HEGCl catalyst was able to build nearly the same epoxy equivalent weight as 100% of the ETPPI catalyst. The comparative example and 18% example also consumed approximately the same amount of BPA. These results clearly show that HEGCl is substantially more effective or active in regards to building epoxy equivalent weight and reducing residual free BPA in the resin as compared to TPP due to the much higher epoxy build at equivalent catalyst loadings.

Turning to the free BPA results, ETTPI at 10% produced a resin having a free BPA level of 59 ppm. In contrast, the HEGCl at the same loading weight produced less than 40 ppm free BPA using a test which has a sensitivity of 40 ppm.

Test Methods

The determinations made within the Examples may be made using any method known to be useful by those of ordinary skill in the art. Exemplary methods include, but are not limited to: Gardner Color ASTM D-1544; Viscosity ASTM D445; Nonvolatiles ASTM D2369; epoxy equivalent weight ASTM D1652-11; and Dispersion by Hegman analysis (D1210-05).

Residual BPA may be determined using ASTM D7574.

What is claimed is:

1. A process for making an epoxy resin comprising:
admixing:
   a first epoxy resin having a first epoxy equivalent weight of from about 100 to about 600,
   a diphenolic compound, and
   a guanidinium catalyst, wherein the guanidinium catalyst is present at a concentration of from about 0.004 to about 0.070 weight percent based upon the weight of the first epoxy resin and diphenolic compound; and
forming a second epoxy resin by reacting the admixture, to build the first epoxy equivalent weight to a higher second epoxy equivalent weight of from about 200 to about 10,000; and
wherein the guanidinium catalyst has a general formula:

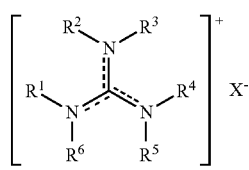

wherein each $R^1$-$R^6$ is independently selected from the group consisting of hydrogen, methyl, ethyl, propyl, butyl, isopropyl, isobutyl, t-butyl, phenyl, and benzyl; and X is an anion selected from the group consisting of halides, alkoxides, organic acid anions, hydroxides, and combinations thereof.

2. The process of claim 1 wherein X is selected from the group consisting of chloride, bromide, iodide, fluoride, t-butoxide, n-butoxide, isobutoxide, tosylate, acetate, methoxide, ethoxide, and combinations thereof.

3. The process of claim 1 wherein the second epoxy resin has a second epoxy equivalent weight of from about 600 to about 3500.

4. The process of claim 1 wherein $R^1$-$R^6$ are the same and are ethyl groups.

5. The process of claim 1 wherein $R^1$-$R^6$ are the same and are n-butyl groups.

6. The process of claim 1, wherein the guanidinium catalyst is present at a concentration of from about 0.025 to about 0.050 weight percent based upon the weight of the first epoxy resin and diphenolic compound.

7. The process of claim 1 additionally comprising employing an optional solvent with the first epoxy resin, diphenolic compound, or both.

8. The process of claim 7 wherein the solvent is selected from the group consisting of methyl ethyl ketone, methyl isobutyl ketone, and combinations thereof.

9. The process of claim 1 wherein the diphenolic compound comprises Bisphenol A.

10. The process of claim 1 wherein the diphenolic compound comprises Bisphenol A, and the second epoxy resin has less than 40 parts per million (PPM) of residual free Bisphenol A.

11. An epoxy resin prepared by the method of claim 1 having an epoxy equivalent weight of from about 200 to about 10,000.

12. An article of manufacture prepared from a composition comprising the epoxy resin of claim 11.

13. The article of manufacture of claim 12 wherein the article of manufacture is a composite.

14. The article of manufacture of claim 12 wherein the article of manufacture is a paint, coating, or adhesive.

* * * * *